Dec. 5, 1950          G. D. FORBES          2,532,546
           MOVING TARGET INDICATING SYSTEM
                Filed Aug. 1, 1945
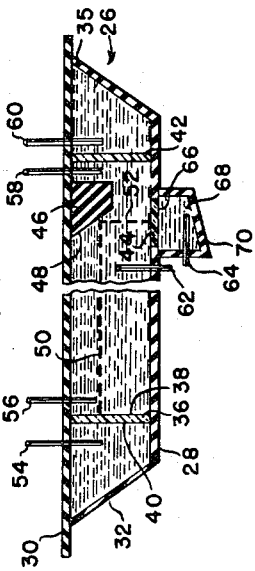
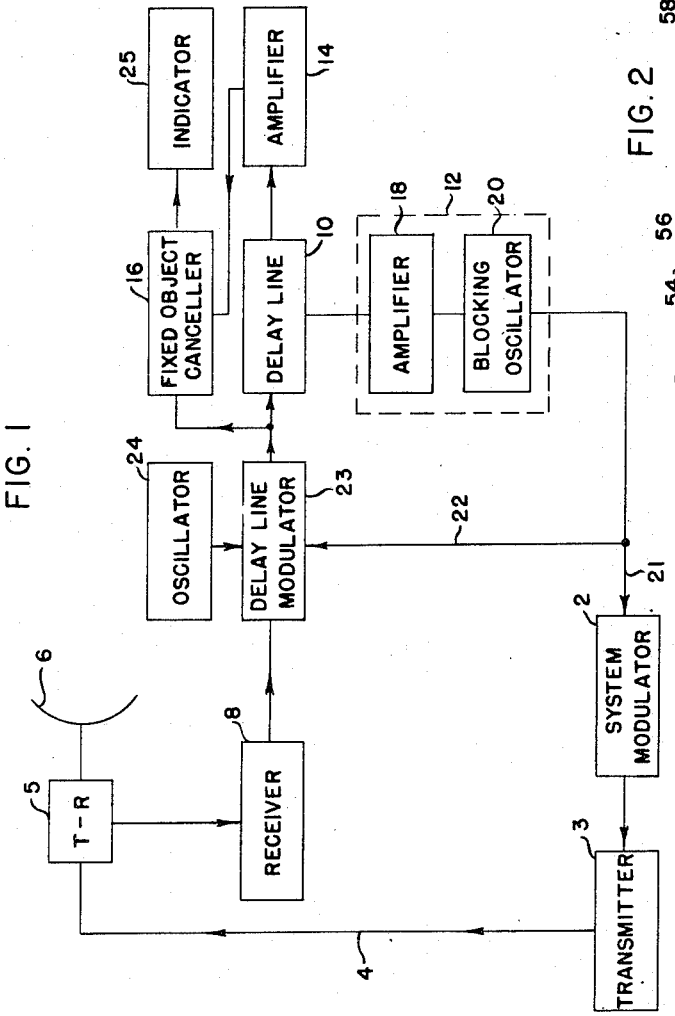
INVENTOR
GORDON DONALD FORBES
BY
*William D. Hall.*
ATTORNEY

Patented Dec. 5, 1950

2,532,546

UNITED STATES PATENT OFFICE 2,532,546

MOVING TARGET INDICATING SYSTEM

Gordon Donald Forbes, Sudbury, Mass., assignor, by mesne assignments, to the United States of America as represented by the Secretary of War Application August 1, 1945, Serial No. 608,311

9 Claims. (Cl. 343—13)

The present invention relates generally to a radio object locating system, and it relates more particularly to a portion thereof whereby the interval between successive exploratory pulses is predetermined by a delay type transmission line.

A radio object locating system, in general, includes a transmitter adapted to radiate short duration high carrier frequency exploratory pulses of radiant energy, and a receiver responsive to object returned echo pulses. These echo pulses are amplified and presented as video pulses on a cathode ray tube indicator. As echo pulses are returned from both fixed and moving objects certain particular objects are "lost in" or obscured by ground clutter and echoes from stationary objects. Various systems have been developed to obviate this difficulty, and one such system is more fully described in a copending application of Robert H. Dicke, Serial No. 590,052, filed April 24, 1945.

In the system described in the referred to application, fixed objects are manifested by video pulses having a constant amplitude, whereas moving objects are manifested by video pulses having a cyclical variation in amplitude.

The distinctive characteristics of moving object echoes, and fixed object echoes may be utilized to provide an indication of moving objects only. In the instance of fixed objects represented by constant amplitude video pulses there is no difference in amplitude between successive echo pulses, however, there is a difference in amplitude between successive video pulses representing moving objects. Thus by comparing any two successive video pulses with a view towards determining the difference in amplitude between them, a residual pulse is obtained for moving objects but not for fixed objects.

The comparison of pulses is achieved in a fixed object canceller which consists of a network adapted to obtain a residual signal proportional to the difference in amplitude between two pulses simultaneously applied thereto. By applying this residual signal to a suitable indicator such as a cathode ray tube, it is evident that moving objects only will be shown thereon. In order to compare any two successive pulses, however, it is necessary to "store" or delay the first video pulse for a period of time equal to the interval between the two pulses. This interval is equal to the predetermined interval between successive exploratory pulses.

One means of accomplishing this delay is by means of a delay type transmission line, sometimes referred to as a delay line. One general type, which is adapted to provide relatively long periods of delay, consists of a transmitting medium confined between two piezo electric crystals. A signal to be delayed is applied to one of the crystals (transmitting crystal) causing it to oscillate in accordance with the well-known piezo electric phenomenon. The mechanical oscillations produced are of the order of 10 to 30 megacycles and are transferred to the transmitting medium as a compressional wave. For optimum bandwidth, and hence good signal fidelity, the acoustic impedance (product of the velocity V of sound through the medium and the density $\rho$ of the medium) of the transmitting medium should be substantially equal (matched) to the acoustic impedance of the crystal. Mercury has this characteristic and hence provides an excellent transmitting medium.

The compressional wave travels through the transmitting medium to the other (receiving) crystal where it stresses said crystal to induce an electric charge thereon. The signal induced on the receiving crystal is of the same general character of the original signal applied to the transmitting crystal, but is delayed for a period of time proportional to the time taken for the compressional wave to travel through the transmitting medium. Although with such lines, a high precision of delay may be obtained, the delayed pulse will not coincide with the successive undelayed pulse if the interval between successive exploratory pulses is not precisely the same as the interval provided by the delay line. Thus two successive pulses cannot be compared as they do not coincide, the result being successive echo pulses representing fixed objects do not cancel, and therefore an undesired residual signal is obtained in the moving object selector. Hence false information appears on the cathode ray tube indicator.

It is therefore an object of the present invention to provide a radio object locating system whereby the interval between successive exploratory pulses is predetermined by a delay line, and where each exploratory pulse is synchronized by the one immediately preceding.

It is another object of the present invention to provide a delay type transmission line adapted to provide two independent delay periods.

The invention will be more fully understood, however, from the following detailed description when taken in connection with the accompanying drawings wherein;

Fig. 1 is a schematic diagram in block form of a radio object locating system embodying the present invention and wherein, Fig. 2 illustrates a sectional view of one embodiment of a delay line forming a part of the present invention.

Referring now to Fig. 1 wherein system modulator 2 provides an actuating pulse for transmitter 3, the output of the latter being applied by transmission means 4 to transmit-receive switch 5 and thence to directional antenna 6. Transmit-receive switch 5 acts to connect transmitter 3 to antenna 6 during pulse transmission. During the interval between exploratory pulses these connections are reversed. During this interval, and while echo pulses are being received the transmit-receive switch disconnects transmitter 3 from antenna 6, and connects the antenna to receiver 8.

As hereinafter explained the interval between successive exploratory pulses is predetermined by delay line 10, one output thereof acting with pulse generator 12 to provide a synchronizing pulse for system modulator 2.

Delay line 10 is adapted to provide two independent periods of delay, and the output therefrom consists of two delayed signals, one being taken through amplifier 14 to fixed object canceler 16; the other being taken through amplifier 18 to blocking oscillator 20. The signal applied to amplifier 18 is, in general, delayed for a shorter period of time than the signal applied to fixed object canceler 16 through amplifier 14.

The synchronizing function of delay line 10 may be described as follows. Assume that blocking oscillator 20 provides as an output a pulse of electrical energy. This pulse is then applied through connection 21 to system modulator 2 and through connection 22 to delay line modulator 23. The function and purpose of delay line modulator 23 will be more fully described hereinafter. The pulsed output of said modulator is thence applied simultaneously to delay line 10 and to fixed object canceler 16. One output of delay line 10 is applied through amplifier 18 to blocking oscillator 20 as a synchronizing pulse therefor. The cycle is then repeated, the output from said blocking oscillator being applied to system modulator 2 whereby transmitter 3 is actuated, and a second portion of the output of blocking oscillator 20 being applied through connection 22 to delay line modulator 23 to provide a pulsed output. In view of this description it is evident that blocking oscillator 20 is so synchronized that the interval between successive pulses therefrom is predetermined by delay line 10. Thus it is also evident that the output of system modulator 2 is likewise synchronized by the delay line.

As heretofore stated, the output of delay line 10 applied through amplifier 18 is, in general, delayed for a shorter period of time than the output applied through amplifier 14 to fixed object canceler 16. The difference in delay is substantially equal to the additional delay incurred by the passage of a signal through pulse generator 12 and delay line modulator 23. Thus as the interval between respective synchronizing pulses applied to system modulator 2 is predetermined by delay line 10, the interval between successive exploratory pulses is likewise predetermined by delay line 10 and this interval can be made precisely equal to the delay incurred by a signal in passing through delay line 10 and amplifier 14 to fixed object canceler 16.

Delay line modulator 23 may function in a number of ways. Its purpose, however, is to provide a carrier wave for delay line 10, and thereby improve the fidelity of the signal issuing from said delay line. One way in which said modulator may operate is to apply thereto, continuous wave oscillations from oscillator 24, the frequency of said oscillations being of the order of 10 to 30 megacycles. A signal to be delayed may then be applied to modulator 23 to modulate said continuous wave oscillations. For example, if the signal is a pulse, the modulator output consists of pulsed carrier wave oscillations. Another mode of operation is to apply the signal to be delayed as a video pulse to said modulator, and add said video pulse to the continuous wave oscillations.

It is to be understood that other methods of modulation may also be used, and the major purpose of such a carrier is to maintain the characteristic of the signal applied to said modulator, and thereby obtain a signal of a similar characteristic at fixed object canceler 16.

Echo pulses received by antenna 6 and passing through receiver 8 are applied to delay line modulator 23. The modulated output therefrom is then applied simultaneously to delay line 10 and to fixed object canceler 16. As successive pulses from fixed objects have a constant amplitude, they cancel in fixed object canceler 16, and no residual output is obtained therefrom. Successive echoes from moving objects, on the other hand, vary in amplitude and hence by comparing a delayed pulse to an undelayed pulse in fixed object canceler 16, a residual output is obtained and applied to indicator 25 to provide an indication of moving objects.

Referring now to Fig. 2 which shows a sectional view of delay line 10 (Fig. 1) the delay line consists of a tank 26 having a bottom 28, a cover 30, two side walls (not shown) and two end walls 32 and 35, respectively, inclined to bottom 28. The tank (or container) 26 may be made of any suitable material, "Bakelite" or glass being excellent. A transmitting piezo electric crystal 36, having its oscillating faces 38 and 40 substantially perpendicular to bottom 28 of the tank, is disposed a predetermined distance from one end of said tank. The crystal is joined to the bottom and sides of the tank to form a partition therein.

At a predetermined distance from the other end of said tank a second and similar crystal (receiving) 42 is similarly mounted to form a similar partition. A second receiving crystal 44 hereinafter called a synchronizing crystal is inserted in bottom 28 to form a "window" therein. A transmitting medium is introduced into tank 26 to a depth sufficient to cover both oscillating faces of crystals 36 and 42. A specific transmitting medium is not required, but the medium employed should preferably have an acoustic impedance substantially equal to the acoustic impedance of the piezo electric crystal. As mercury meets this requirement it forms an excellent medium. Furthermore, as it is electrically conductive it provides a simple means of forming an electrical connection to the respective oscillating faces of the crystals.

A reflector 46 is associated with cover 30 so that it (reflector 46) projects into the tank. The position of this reflector is adjustable so that it may be placed at predetermined points along the general longitudinal axis of the tank. Reflecting face 48 of reflector 46 is angularly disposed so that compressional wave energy following path 50 is caused to reflect along path 52 and impinge on synchronizing crystal 44.

Reflector 46 may be made of any material which is adapted to reflect compressional wave energy. If mercury is used as a transmitting medium "Bakelite" forms an excellent reflecting surface, for in such an instance the acoustic impedance of "Bakelite" forms an appreciable mismatch with the acoustic impedance of the mercury and hence very little compressional wave energy is absorbed by the reflector, and indeed most of it is reflected thereby. If other materials are used that do not form an impedance mismatch to the transmitting medium (and hence do not readily reflect compressional wave energy) the angular disposition of reflecting face 48 should be such that compressional wave energy striking said face impinges thereon at an angle greater than the critical angle (the angle above which energy is reflected and below which energy is refracted).

A signal to be delayed may be impressed across the oscillating faces of transmitting crystal 36 in any suitable manner. One method is to employ a pair of terminals 54 and 56 associated with each oscillating face of the transmitting crystal. Each terminal extends through the cover and projects into the mercury, i. e., in the present embodiment terminal 54 projects into the mercury confined between transmitting crystal 36 and end wall 32, whereas terminal 56 extends through cover 30 and projects into the mercury confined between transmitting crystal 36 and receiving crystal 42. Receiving crystal 42 and synchronizing crystals 44 each have a similar pair of terminals 58 and 60, and 62 and 64 respectively.

The angular disposition of end wall 32 is such as to suppress oscillations produced by oscillating face 40 of crystal 36. The action of a reflecting wall of this general character is more fully described in Patent No. 2,423,306, filed on August 1, 1945 and issued July 1, 1947 to G. Donald Forbes and Herbert Shapiro. In brief, the oscillations of face 40 of crystal 36 must be damped to prevent distortion of the delayed pulses received at terminals 58 and 60 and terminals 62 and 64. To do this, a medium, such as mercury, having an acoustic impedance substantially equal to the acoustic impedance of the crystal is introduced to the container between crystal 40 and end wall 32. Although this medium damps the crystal oscillations, undesirable oscillations are set up in said medium. The angular disposition of end wall 32 is such that the undesired oscillations are multiply reflected thereby, and finally after an appreciable time are refracted through crystal 36 in such a way as to produce a random (due to multiple reflection) output signal at crystal 42. This signal occurs at crystal 42 an appreciable time later than the original signal produced by oscillating face 38. Furthermore as the undesired oscillations are angularly refracted through crystal 36 they likewise strike crystal 42 at an angle, and as a result the signal produced thereby is so small as to cause no difficulty. End wall 35 performs the same function for crystal 42. Similarly some suppression means is required for the outer oscillating face 66 of synchronizing crystal 44. To accomplish this a mercury filled cavity 68 is provided, wall 70 opposite crystal face 66 being angularly disposed thereto and performing a function similar to end walls 32 and 35 respectively.

The operation of the delay line above described in the radio object locating system shown in Fig. 1 is as follows. For clarity and ease of description, consider first a pulse issuing from blocking oscillator 20 which is applied through connection 22 to delay line modulator 23. Likewise assume that the mode of operation in delay line modulator 23 is such that in the absence of a pulse input thereto continuous wave oscillations are applied to transmitting crystal 36, (by means of terminals 54 and 56) thereby causing said crystal to vibrate mechanically and produce a compressional wave in the transmitting medium confined between crystal 36 and crystal 42. If the mode of operation of delay line modulator 23 is such that the video pulse from blocking oscillator 20 is added to the output from delay line modulator 23, the additional pulse is likewise applied to transmitting crystal 36. The effect of this signal is to pulse modulate the compressional wave energy traveling through the transmitting medium in the delay line. This pulsed compressional wave energy travels along path 50, strikes reflecting face 48 of reflector 46, being thereby directed to synchronizing crystal 44. This pulse modulated reflected compressional wave energy stresses crystal 44 to induce a signal thereon which is developed across terminals 62 and 64. This signal is similar to that applied to input terminals 54 and 56, and is applied to amplifier 18, the output of which synchronizes blocking oscillator 20. The cycle then repeats itself and it is evident that the interval between the pulse issuing from blocking oscillator 20 is determined by the delay line.

A second portion of the pulse modulated compressional wave energy produced by oscillating face 38 of crystal 36 is propagated through the transmitting medium and impinges on receiving crystal 42 to induce a pulse modulated signal thereon. This signal is likewise similar to that applied to input terminals 54 and 56 and is developed across output terminals 58 and 60 and then applied through amplifier 14 to fixed object canceler 16.

The pulse modulated signal developed across terminals 62 and 64 is delayed an amount proportional to the length of path traveled by the pulse modulated compressional wave from crystal face 38 along path 50 to reflecting face 48 of reflector 46 and thence along path 52 to crystal 44. This delay is less than the delay incurred by the pulse modulated compressional wave traveling from oscillating face 38 of transmitting crystal 36 through receiving crystal 42 by an amount substantially equal to the finite time delay incurred in pulse generator 12.

Although the synchronizing crystal is shown and described as being inserted in bottom 28 of tank 26 it is to be understood that said crystal may be similarly inserted in other parts of tank 26, such as for example in one of the side walls (not shown). In such an instance reflector 46 could be mounted on the opposite side wall to reflect compressional wave energy to said synchronizing crystal.

While there has been here described one embodiment of the present invention it will be manifest to those skilled in the art that various changes and modifications may be made therein without departing from the invention. It is therefore aimed in the appended claims to cover all such changes and modifications as fall within the spirit and scope of the invention.

I claim:

1. In a radio object locating system having an exploratory pulse transmitter adapted to transmit short duration high carrier frequency exploratory pulses of radiant energy and having a first pulse generating means adapted to periodically actuate said transmitter; a delay type transmission line, said delay type transmission line having a transmitting piezo electrical crystal, a receiving piezo electrical crystal, a synchronizing piezo electric crystal, an adjustable reflector and a transmitting medium, a second pulse generating means, a first portion of each output pulse issuing from said second pulse generating means synchronizing said first pulse generating means, means for applying a second portion of each pulse issuing from said second pulse generating means to said transmitting crystal to set up compressional wave energy in said transmitting medium, a first portion of said compressional wave energy being reflected by said adjustable reflector and impinging on said synchronizing crystal to produce a charge thereon, means for applying said charge as a synchronizing signal to said second pulse generating means whereby the interval between pulses issuing from said second pulse generating means is predetermined by said adjustable reflector in said delay type transmission line, a second portion of said compressional wave energy generated by said transmitting crystal impinging on said receiving crystal to likewise produce a charge thereon, the path lengths traveled by said compressional wave energy being such that the time taken by said first portion of said compressional wave energy to travel from said transmitting crystal to said synchronizing crystal is less than the time taken by said second portion of said compressional wave energy to travel from said transmitting crystal to said receiving crystal by an amount substantially equal to the finite time delay incurred in said second pulse generating means, a target echo pulse receiver coupled to said transmitting crystal, an indicator, and pulse cancelling means having its output coupled to said indicator, said pulse cancelling means being receptive of the output of said receiving crystal and the output of said receiver, whereby the interval between successive exploratory pulses is substantially equal to the time taken for compressional wave energy to travel from said transmitting crystal to said receiving crystal, said interval between successive exploratory pulses remains substantially constant, and echoes from only moving targets will appear on said indicator.

2. In a radio object locating system of the character described which has indicator means, receiver means, an exploratory pulse transmitter and a transmitter actuating means; a delay type transmission line, means for applying a pulse input to said delay type transmission line to set up wave energy therein, means in said delay type transmission line whereby a portion of said wave energy follows a first predetermined path, means whereby a second portion of said wave energy follows a second predetermined path, means at the end of said first path for transforming said wave energy into a first pulse output of electrical energy, means for applying a first portion of said first pulse output as said pulse input to said delay type transmission line, means for applying a second portion of said first pulse output to said transmitter actuating means, means at the end of said second path for forming said wave energy into a second pulse output of electrical energy, cancelling means coupled to said indicator means and receptive of said second pulse output and a portion of said pulse input, said receiver means being coupled to the input of said delay type transmission line and receptive of pulse target echoes, whereby the time interval between exploratory pulses is substantially equal to the time taken for said wave energy to travel along said second predetermined path, and said cancelling means will permit echoes from only moving targets to be depicted upon said indicator means.

3. In a radio object locating system having an exploratory pulse transmitter, a delay type transmission line, means for applying a signal pulse input to said delay type transmission line to set up wave energy therein, means in said delay line whereby a portion of said wave energy follows a predetermined path, means at the end of said path for transforming said wave energy into a signal pulse output of electrical energy, means for applying a first portion of said signal pulse output as said signal pulse input to said delay type transmission line, means for employing a second portion of said signal output to activate said transmitter, whereby the interval between exploratory pulses is predetermined by said delay type transmission line.

4. A delay type transmission line including a container having a bottom, two side walls and two end walls, said end walls being inclined to said bottom, a transmitting piezo electric crystal having its oscillating faces substantially perpendicular to said bottom, means for joining said crystal to said bottom and said walls to form a partition across said container, said partition being disposed a predetermined distance from one end of said container, a first receiving piezo electric crystal similar to said transmitting crystal and similarly mounted to form a partition a predetermined distance from the other end of said container, a second receiving piezo electric crystal inserted in said bottom to form a window therein, a cavity external to said container, one wall of said cavity being formed by said second receiving crystal, the wall opposite said crystal being inclined at an angle thereto, a transmitting medium in said container of sufficient depth to cover the oscillating faces of said crystals, the transmitting medium confined between said transmitting and first receiving crystals being electrically insulated from the transmitting medium confined between said transmitting crystal and one end wall, and said first receiving crystal and the other end wall, means for impressing a signal to be delayed across said transmitting crystal to set up compressional wave energy in said transmitting medium, means for obtaining a first delayed output across said second receiving crystal, means for obtaining a second delayed output across said first receiving crystal.

5. A delay type transmission line adapted to delay signals of electrical energy including a container holding a transmitting medium, a transmitting piezo electric crystal, and a plurality of receiving piezo electric crystals, means for applying a signal to be delayed to said transmitting crystal to set up compressional wave energy in said transmitting medium, means for directing said compressional wave energy along a plurality of predetermined paths to impinge on said receiving crystals to induce an electrical signal thereon, one receiving crystal being associated with each predetermined path, said last named means including variable reflector means for adjusting the length of at least one of said predetermined paths, the electrical signal developed at each receiving crystal being similar to the signal applied to said transmitting crystal, delayed a predetermined time, the delay incurred being proportional to the respective path length traveled by the compressional wave from said transmitting crystal to the respective receiving crystal.

6. A means for delaying signals of electrical energy for predetermined periods of time including a transmission line, means for applying a signal to be delayed thereto, means for predetermining the time taken for a signal to travel down a first predetermined path to one end of said line, variable reflector means within said transmission line for shunting a portion of the signal traveling down the line along a second predetermined path whereby the signal traveling along said second path is delayed a different length of time than the signal traveling along said first path.

7. A radio object locating system as set forth in claim 3, wherein said first and third named means include piezoelectric crystals, said delay type transmission line has a transmitting medium within it, and also including adjustable deflecting means within said delay type transmission line for determining the path of the wave energy produced within said transmitting medium.

8. A transmission line as set forth in claim 5, wherein said transmitting medium has an acoustic impedance equal to that of said piezoelectric crystals.

9. A transmission line as set forth in claim 8, wherein said transmitting medium is mercury.

GORDON DONALD FORBES.

REFERENCES CITED

The following references are of record in the file of this patent:

UNITED STATES PATENTS

| Number | Name | Date |
| --- | --- | --- |
| 1,854,432 | Thurston | Apr. 19, 1932 |
| 2,263,902 | Percival | Nov. 25, 1941 |
| 2,291,555 | Nyquist | July 28, 1942 |
| 2,382,198 | Bollinger | Aug. 14, 1945 |

FOREIGN PATENTS

| Number | Country | Date |
| --- | --- | --- |
| 711,667 | France | June 30, 1931 |